(12) United States Patent
Good et al.

(10) Patent No.: US 6,215,074 B1
(45) Date of Patent: Apr. 10, 2001

(54) DIRECT MOUNTING SYSTEM FOR A DISK DRIVE

(75) Inventors: Michael S. Good, Byron; Douglas Wayne Johnson; Subrahmanyan Nagarajan, both of Rochester; Brian Lee Rappel, Grand Meadow; Laurence J. Schmidt; Dennis Ronald Ziegenhagen, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/236,771

(22) Filed: Apr. 29, 1994

(51) Int. Cl.[7] .................................................. H01B 17/24
(52) U.S. Cl. ...................................... 174/138 G; 361/685
(58) Field of Search ............................... 174/138 G, 50, 174/65 G; 361/685; 411/508, 509, 510, 111, 112, 113, 138, 141, 903, 907, 908

(56) References Cited

U.S. PATENT DOCUMENTS

| | | |
|---|---|---|
| 1,774,695 | 9/1930 | Baynes . |
| 2,225,472 * | 12/1940 | Franklin ........................ 174/65 G X |
| 2,311,427 * | 2/1943 | Winkelmeyer ................ 174/65 G X |
| 3,740,083 * | 6/1973 | Zenhausern .......................... 287/20.3 |
| 3,783,734 | 1/1974 | Velthoven ................................ 85/62 |
| 3,869,958 | 3/1975 | Murayama ............................... 85/80 |
| 3,869,959 | 3/1975 | Moen ....................................... 85/83 |
| 4,089,248 | 5/1978 | Anscher ................................... 85/71 |
| 4,208,944 | 6/1980 | Moryl ...................................... 85/71 |
| 4,366,603 * | 1/1983 | Hulse ................................. 24/221 R |
| 4,391,559 | 7/1983 | Mizusawa .............................. 411/45 |
| 4,521,148 | 6/1985 | Tanaka ................................. 411/182 |
| 4,878,791 | 11/1989 | Kurihara et al. ...................... 411/55 |
| 4,901,395 * | 2/1990 | Semrau ........................ 174/65 G X |
| 4,952,107 * | 8/1990 | Dupree ................................. 411/82 |
| 5,039,267 * | 8/1991 | Wollar ................................. 411/508 |
| 5,079,655 | 1/1992 | Yagi ................................. 360/97.02 |
| 5,136,466 * | 8/1992 | Remise et al. ...................... 361/391 |
| 5,227,954 * | 7/1993 | Twigg ................................. 361/391 |
| 5,333,098 | 7/1994 | DeLuca et al. ..................... 361/685 |

FOREIGN PATENT DOCUMENTS

| | | |
|---|---|---|
| 0256960 | 10/1963 | (AU) . |
| 0380447 | 9/1964 | (DE) . |
| 0335490 | 2/1989 | (EP) ............................. G11B/33/12 |
| 0421847 | 9/1990 | (EP) ............................... H05K/7/14 |

* cited by examiner

Primary Examiner—Dean A. Reichard
(74) Attorney, Agent, or Firm—Richard E. Billion; Owen J. Gamon (57) ABSTRACT

Disclosed is a disk drive for storing data which includes disks and an actuator mounted on a frame or first housing part. A second housing part, when joined with the first housing part, forms a disk enclosure. The disk enclosure includes rails which have openings therein for mounting the disk drive to the user frame of a computer system. Deformable inserts are placed into the openings in the rails and screws are passed through openings in the frame of the computer system and into the inserts in the openings in the rails of the disk drive. The inserts are more forgiving and result in less distortion than in a mounting system in which the screws are passed directly into tapped holes in the rails of the disk drive. The inserts also electrically insulate the disk drive from the user frame of the computer system.

30 Claims, 10 Drawing Sheets

DIRECT MOUNTING SYSTEM FOR A DISK DRIVE

FIELD OF THE INVENTION

The present invention pertains to the field of data storage devices such as disk drives which are also called direct access storage devices (DASD).

More particularly, this invention pertains to an apparatus and method used to mount the disk drives to a frame within a computer system so as to provide an electrically insulated mounting as well as one that will not cause distortion to the housing of the disk drive.

BACKGROUND OF THE INVENTION

One of the key components of a computer system is a place to store data. Typically computer systems employ a number of storage means to store data for use by a typical computer system. One of the places where a computer can store data is in a disk drive which is also called a direct access storage device.

A disk drive or direct access storage device includes several disks which look similar to 45 rpm records used on a record player or compact disks which are used in a CD player. The disks are stacked on a spindle, much like several 45 rpm records awaiting to be played. In a disk drive, however, the disks are mounted to spindle and spaced apart so that the separate disks do not touch each other.

The surface of each disk is uniform in appearance. However, in actuality, each of the surfaces is divided into portions where data is stored. There are a very high number of tracks situated in concentric circles like rings on a tree. Compact disks have tracks as do the disks in a disk drive. The tracks in either the disk drive or the compact disk essentially replace the grooves in a 45 rpm record. In each drive there are a very high number of tracks. Currently available disk drives have as many as 4000 tracks per inch. Each track in a disk drive is further subdivided into a number of sectors which is essentially just one piece of the track.

Disks in a disk drive are made of a variety of materials. Most commonly, the disks used in rotating magnetic systems is made of a substrate of metal, ceramic, glass or plastic with a very thin magnetizable layer on either side of the substrate. Such a disk is used in magnetic, and magneto-optical storage. Storage of data on a such a disk entails magnetizing portions of the disk in a pattern which reflects the data. Other disks, such as those used in CD's, are plastic. Data, such as songs, is stored using laser to place pits in the media. A laser is used to read the data from the disk.

As mentioned above, to store data on a disk used in a rotating magnetic system, the disk is magnetized. In order to magnetize the surface of a disk, a small ceramic block known as a slider which contains at least one magnetic transducer known as a read/write head is passed over the surface of the disk. These combination read/write heads come in several varieties including ferrite heads, metal in gap ferrite heads and thin film heads. Some ceramic blocks contain a separate read head and a separate write head. The separate read head can be a magnetoresistive head which is also known as an MR head. Each one of these types of heads is sensitive to electrical discharge. The MR head is the most electrically sensitive of the transducers mentioned above.

In addition to being an electrically-sensitive device, a disk drive is a very, very precise piece of mechanical machinery. For example, the ceramic block which holds one of the types of heads discussed above, is flown at a height of approximately six millionths of an inch or less from the surface of the disk and is flown over the track as the transducing head is energized to various states causing the track below to be magnetized to represent the data to be stored. In many disk drives the fly heighth is approximately three millionths of an inch. Some systems now also use near contact recording where the slider essentially rides on molecules of liquid lubricant on the surface of the disk. With near contact recording, the ceramic block passes over the disk within one millionth of an inch or less.

To retrieve data stored on a magnetic disk, the ceramic block or slider containing the transducing head is passed over the disk. The magnetized portions of the disk induce a current in the transducer or read head. By looking at output from the transducer or read head, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own slider and transducing head. This arrangement is comparable to having a stereo that could be ready to play both sides of a record at anytime. Each side would have a stylus which played the particular side of the record.

Disk drives also have something that compares to the tone arm of a stereo record player. The tone arm of a disk drive, termed an actuator arm, holds all the sliders and their associated transducing heads, one head for each surface of each disk supported in a structure that looks like a comb at one end. The structure is also commonly called an E block. A portion of metal, known as a suspension, connects the sliders to the E block. At the other end of the actuator is a coil which makes up a portion of an voice coil motor used to move the actuator. The entire assembly is commonly referred to as an actuator assembly.

Like a tone arm, the actuator arms rotate so that the transducers within the sliders, which are attached to the actuator arm can be moved to locations over various tracks on the disk. In this way, the transducing heads can be used to magnetize the surface of the disk in a pattern representing the data at one of several track locations or used to detect the magnetized pattern on one of the tracks of a disk. Actuators such as the ones described above are common to any type of disk drive whether its magnetic, magneto-optical or optical.

As mentioned above, there are a very large number of tracks per inch on the disk of a disk drive. The actuator is used to very precisely move the transducer to the position over a particular track. Sophisticated electronics are used to keep the actuator over a particular track on a disk. In the industry, this is referred to as track follow servoing. As many as 128 samples are taken on each revolution of the disk to make sure that the transducer is following or tracking a particular track on a disk. Holding the transducer over a particular track while it's rotating at 7200 revolutions per minute can become difficult if vibrations are introduced into the disk drive.

In the past, disk drives were much larger in size and the spacing between the tracks, known in the industry as track spacing, was farther. In the past, large shock absorbing pads were used in an attempt to isolate vibrations and prevent them from causing problems with the disk drive's servoing system. The shock absorbing systems usually include a large rubber grommets on large bolts and came in a variety of arrangements. Presently, as disk drives have become smaller and smaller, the track to track spacing has become closer such that the large shock absorbing systems of the past no longer prevent problems. The large shock absorbing systems of the past transmit vibrations which cause the actuator and slider attached to it to vibrate. Since the transducer is carried by the slider, the vibrations cause the transducer to vibrate back and forth across the track. Errors in reading result since the transducer can not maintain a position over the track where the representations of the data are stored. Its kind of like trying to read a book in an automobile. An adult can read a child's book with large print quite easily in a luxury car, but its impossible to read the fine print at the end of a contract while riding down a bumpy road in a subcompact.

Also, as a practical matter, the shock absorbing systems of the past are too large for today's disk drives. The large shock absorbers are mostly on the 5.25" form factor disk drives. For today's 3.5" disk drives, which are, at most, one-quarter the size of the 5.25" form factor disk drives, the shock absorbers take up too much space. The shock absorbers can not be designed to fit the smaller form factor drives given the space constraints associated with the smaller form factor drive. Simply put, on 3.5" disk drives and smaller form factor disk drives cannot accommodate the shock absorbing systems designed for the much larger drives of the past.

With these smaller form factor disk drives, designers have elected to directly mount the disk drives to the frames of the computer into which the disk drives will be placed. Most of the disk drives include threaded openings which directly receive screws from the frame of the computer system. Another problem has cropped up as a result. When a screw is directly threaded into the housing or frame of a disk drive it causes distortion of the housing. To prevent problems in the operation of the disk drives, the torque or amount of force used to thread the screw into the disk drive must be carefully controlled to limit the distortion caused so problems will not result. The distortions that result are very small in terms of what most people think would result in a problem. However, if these screws are overtorqued slightly the distortion in a metal frame can result in the actuator not properly reading the data on the disk. The distortion will essentially move disks slightly with respect to the actuator.

The amount of torque applied to a screw for mounting a disk drive can probably be controlled somewhat at some manufacturing sites. Some manufacturers are probably sophisticated enough to control the amount of torque or force applied to a screw for mounting a disk drive. However, many other manufacturers of computer systems as well as end-users which buy these disk drives to put into their home systems or business systems merely tighten the screws until they feel it is "snug". What is considered properly "snug" to end users applying torque to a screw will vary. Varying degrees of "snuggness" will result in some problems. Accordingly, there is a need for a method to directly mount the disk drive to a computer system such that the torque applied to a fastener is not as critical and hence will not result in excessive distortion of the disk drive frame.

Another problem is associated with the use of electrically sensitive components within the disk drive. One example of an extremely sensitive electrical component is the magnetoresistive transducing heads that are now becoming more common in the industry. The DC voltage of the housing must be carefully controlled and as a result the disk drive must be mounted to the computer system such that the housing is electrically isolated from the computer system. Consequently, in addition to the need above, there is also a need for a mounting system that will allow the disk drive to be electrically isolated from the computer system into which it is to be mounted.

In short, a disk drive is a very mechanically precise and electrically sensitive device and because the size of the device is consistently becoming smaller and smaller, there is a need for a mounting system or apparatus that will allow direct mounting of the drive to the computer system while electrically isolating that drive from the computer system. There is also a need for a disk drive mounting system that minimizes the distortion on the disk drive despite wide variance in the tightening sequence and amount of torque applied to the screws used to mount the disk drive to the computer system.

SUMMARY OF THE INVENTION

Therefore, one of the objects of the invention is to have a quick and easy mounting means for mounting the disk drive to the computer.

Another object of the invention is to have a mounting system that minimizes distortion to the disk drives despite a wide variance in the mounting procedures used to mount the disk drive to the users computer.

A further object of the invention is a mounting system that electrically insulates the disk drive from the users computer.

These and other objects as well as further advantages are accomplished by the disclosed invention. The disk drive rails are provided with openings that receive deformable inserts that allow the drives to be solidly mounted to a computer while minimizing distortions to the disk drive. Fasteners are passed through the frame of the computer and into the deformable inserts. The inserts can be made of a variety of materials such as plastic. Advantageously, the inserts also electrically insulate the disk drive from the frame component of the computer to provide for a much more controlled environment for the electrically sensitive components associated with the disk drive. The openings in the rails of the disk drive can be round. Preferably, the openings are slightly oblong. The slightly oblong openings in the rails allow the inserts and the fasteners mounted therein to retain torque capacity over a longer period of time.

BRIEF DESCRIPTION OF THE DRAWINGS

For a better understanding of the present invention, reference can be made to the accompanying drawings, in which.

These drawings are not intended as a definition of the invention but are provided solely for the purpose of illustrating the preferred embodiments of the invention described below.

DETAILED DESCRIPTION OF THE PREFERRED EMBODIMENT

Figure 1:
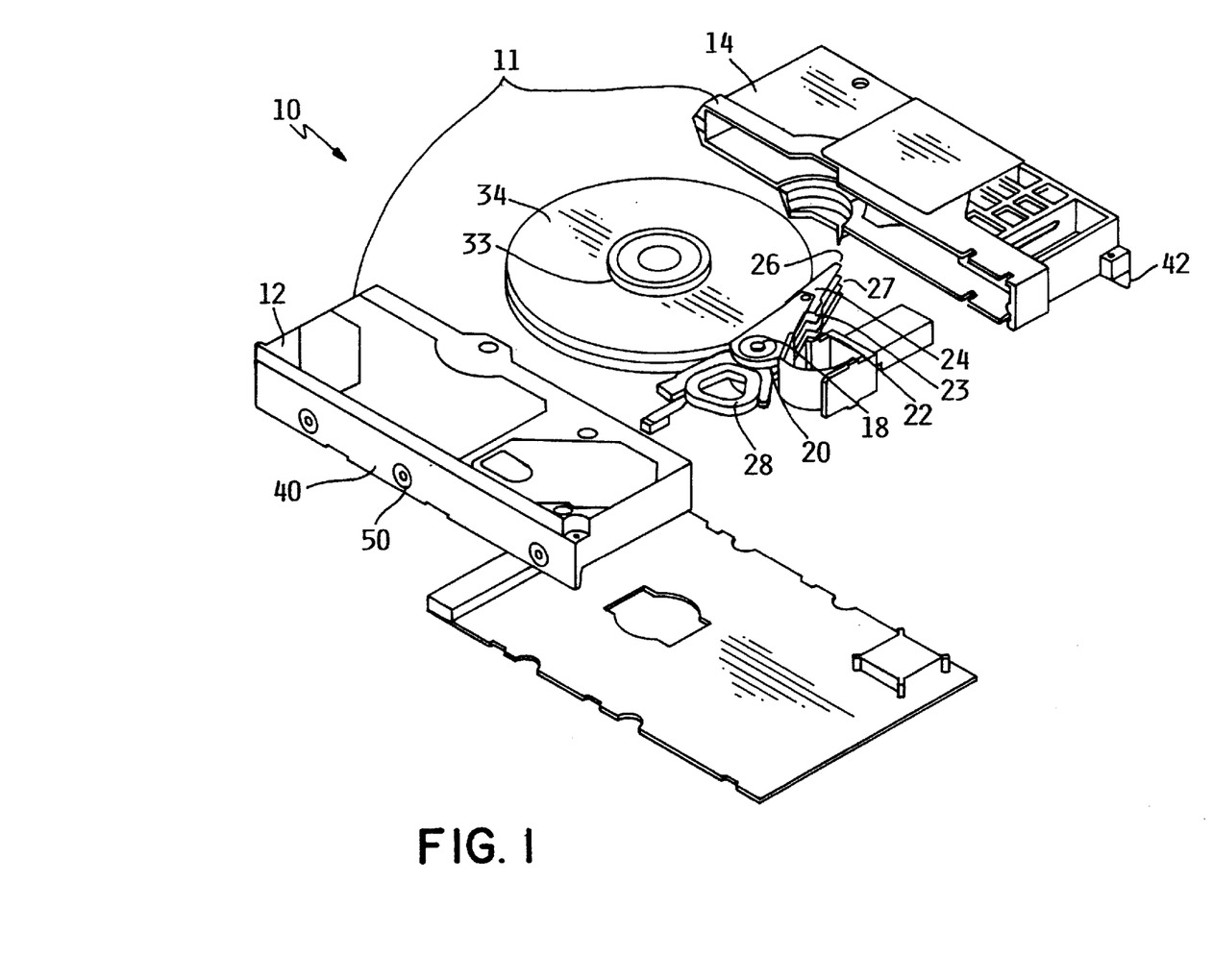
FIG. 1 is an exploded view of a disk drive.

The invention described in this application is useful with all mechanical configurations of disk drives or direct access storage devices ("DASD") having either rotary or linear actuation. FIG. 1 is an exploded view of a disk drive 10 having a rotary actuator. The disk drive 10 includes a two part housing 11. The first part of the housing 12 and a second part of the housing 14. The first part of the housing 12 and the second part of the housing 14 form a disk enclosure. Rotatably attached to the first part of the housing 12 on an actuator shaft 18 is an actuator assembly 20. The actuator assembly 20 includes a comb-like structure 22 having a plurality of arms 23. Attached to the separate arms 23 on the comb 22, are load beams or load springs 24. Attached at the end of each load spring 24 is a slider 26 which carries a magnetic transducer 27. The slider 26 with the transducer 27 form what is many times called the head. It should be noted that many sliders have one transducer 27 and that is what is shown in the Figures. It should also be noted that this invention is equally applicable to sliders having more than one transducer, such as what is referred to as an MR or magneto resistive head in which one transducer 27 is generally used for reading and another is generally used for writing. On the end of the actuator arm assembly 20 opposite the load springs 24 and the sliders 26 is a voice coil 28.

Attached within the first part of the housing 12 is a pair of magnets (not shown). The pair of magnets and the voice coil 28 are key parts of a voice coil motor which applies a force to the actuator assembly 20 to rotate it about the actuator shaft 18. Also mounted to the first part of the housing 12 is a spindle motor. The spindle motor includes rotating portion called the spindle hub 33. In FIG. 1, a several disks 34 are attached to the spindle hub 33. In other disk drives the number of disks to the hub varies. In some disk drives only one disk is attached to the hub 33. The invention described herein is equally applicable to all disk drives irrespective of the number of disks attached to the hub of the spindle motor.

The first part of the housing 12 and the second part of the housing 14 are typically castings. Both the first part of the housing 12 and the second part of the housing have a relatively thin rail cast therein so that when the first part of the housing 12 is connected to the second part of the housing 14, the housing 11 formed has two rails 40 and 42. Each of the rails 40, 42 has a series of openings therein which correspond and essentially match the openings found in computer systems to which the housing 11 mounts.

Figure 2:
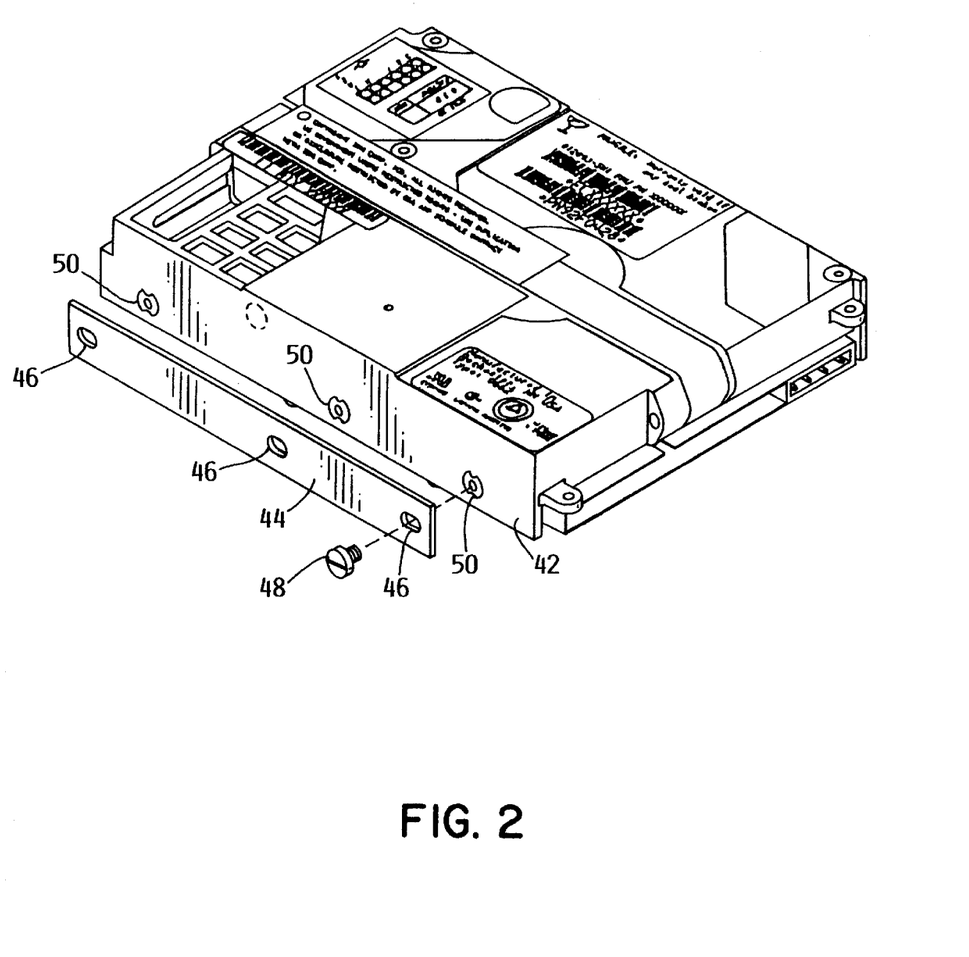
FIG. 2 is a disk drive having inserts therein and about to be mounted to a representative frame from a computer system with fasteners.

FIG. 2 shows an assembled disk drive 10 in which the housing 11 has been assembled. One of the rails 42 is shown on the side of the disk drive. The rail 42 includes three openings which correspond to the openings in the frame 44 of the user's computer system. The user frame 44 is also shown in FIG. 2. The user frame 44 includes three slotted openings 46. A mounting screw 48 is passed through one of the openings 46 in the user frame and into the openings in the rail 42 shown. In FIG. 2, however, rather than having tapped or threaded openings, there is an insert (such as 50,60,70,or 80) in each one of the openings in the rail 42. Now rather than the mounting screw 48 directly a threaded opening in a rail (as in the past), the mounting screw 48 passes into the insert 50, 60 70 or 80. The insert 50, 60, 70, or 80 can either be self-tapping or can include a threaded portion for receiving the screw 48. The insert is also made of a material which is deformable and acts as an electrical insulator. Advantageously, by using the insert the disk drive can be electrically isolated from the user frame 44 and the deformable characteristic provides for a appropriate mounting that can be torqued through a wide range of values without resulting in excessive deformation to the disk drive which could cause errors.

Figure 3A:
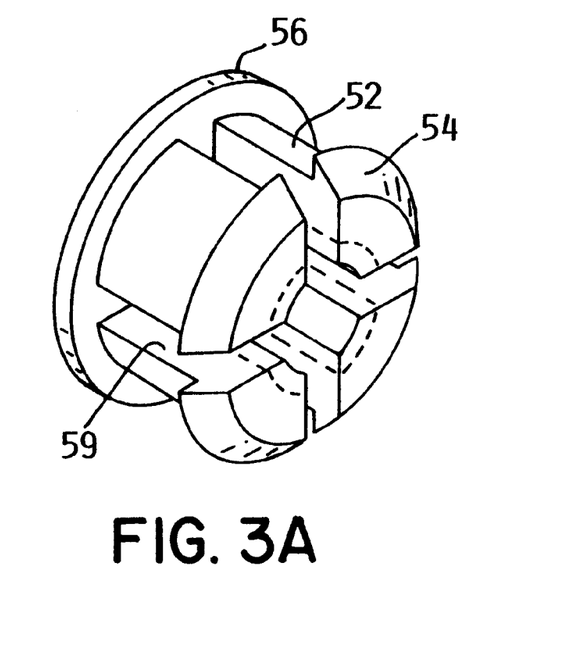
FIG. 3a is a perspective view of one of the inserts.
Figure 3B:
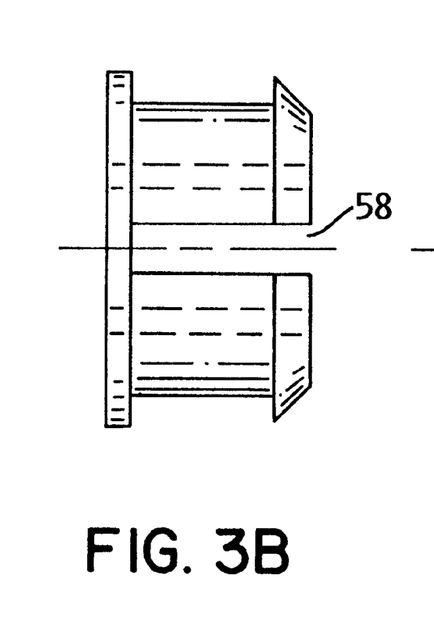
FIG. 3b is a side view of one of the inserts.
Figure 3C:
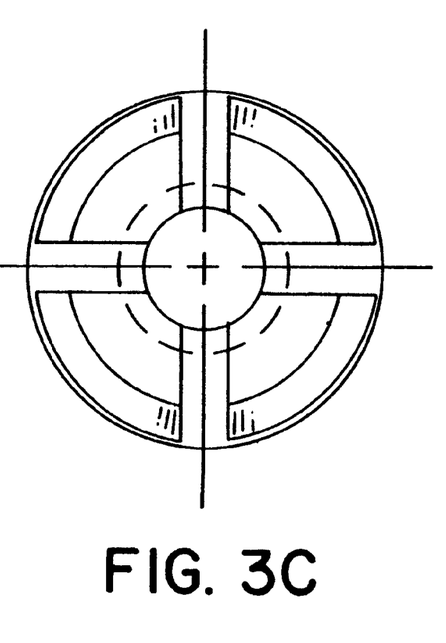
FIG. 3c is a front view of one of the inserts.

The insert comes in a wide variety of types. These types will now be described. The first type of insert 50 is shown in FIGS. 3a, 3b, and 3c. Each of the inserts 50, 60, 70 and 80, include common portions. Most of the common portions will be numbered with the same digit in the ones portion of the element number and the digit in the tens position will change to correspond to the specific insert. The insert 50 includes a cylindrical portion 52 having a barb 54 at one end and a lip 56 at the other. An opening 58 which is coaxial with the cylindrical portion 52, passes through the entire insert 50. The cylindrical portion 52 and the barb 54 have at least one slit 59 therein. In the particular insert 50 shown in FIGS. 3a, 3b, and 3c there are four such slits 59.

In operation, the insert 50 is placed into the opening in the rail 40 or 42 and the slits 59 allow the cylindrical portion 52 and barb 54 to move inwardly to ease insertion of the insert into the opening. The insert is pushed into the opening until the lip 56 contacts the surface of the rail, 40 or 42 near the opening. The screw 48 from the computer system is then received in the opening 58 which can be either self-tapping or already provided with threads. As the screw 48 from the computer system enters the opening 58, the cylindrical portion 52 and the barb 54 of the insert 50 are forced into tight engagement with the opening in the rail 40 or 42. The insert 50 is made from a plastic material such as a high-performance polyetherimide resin from GE Plastics of Pittsfield, Mass., with a trade name of Ultem. General Electric Ultem comes in a pure form as well as several series which are modifications of the pure form. The Ultem used in the inserts is the pure form.

Figure 4A:
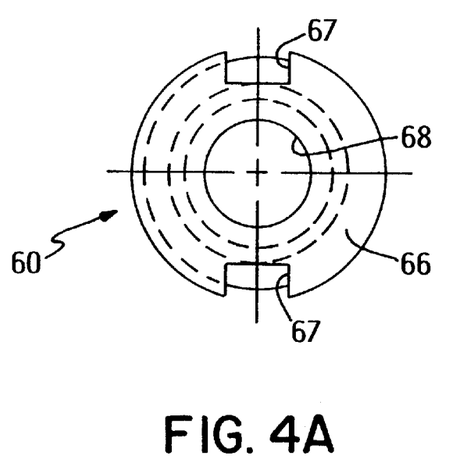
FIG. 4a is a front view of one of the inserts.
Figure 4B:
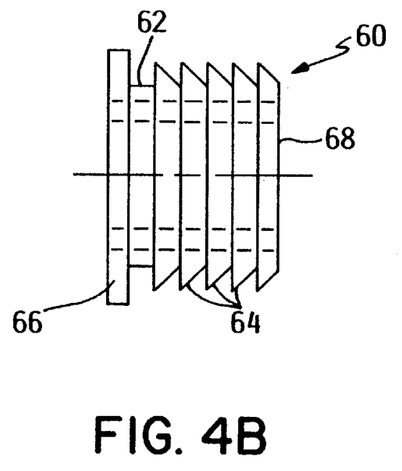
FIG. 4b is a side view of one of the inserts.

A second version of insert 60 is shown with the aid of FIGS. 4a and 4b. Again, the insert 60 includes a cylindrical portion 62 which has a lip or flange 66 at one end. The flange 66 is located at the end which initially receives a screw 48. The insert 60 has a plurality of barbs 64 which run along the cylindrical portion 62 of the insert 60. The insert includes a threaded opening 68 for receiving the screw 48. The threaded opening is coaxial with the cylindrical portion 62 of the insert 60. The flange 66 includes a pair of opposed slots 67 which are features for the insert molding related process and are used to hold the insert in the die when the thread forming portion of the die is being removed.

Figure 5A:
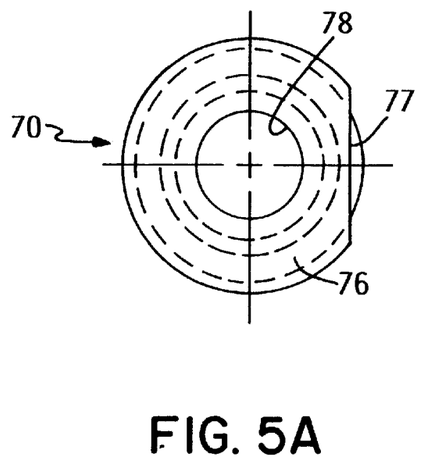
FIG. 5a is a front view of one of the inserts.
Figure 5B:
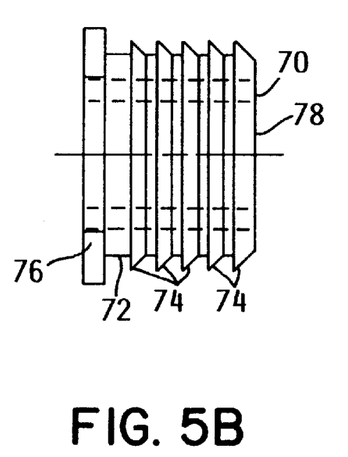
FIG. 5b is a side view of one of the inserts.

Now turning to FIGS. 5a and 5b, insert 70, which is very similar to the insert 60, will now be discussed. The insert 70 includes a cylindrical portion 72 and a flange 76 at the end which receives the screw 48 from the computer frame. Along the cylindrical portion 72 are a plurality of barbs 74. The insert 70 also includes a threaded opening 78 which receives the screw 48 from the user system. The basic difference between the insert 70 and the insert 60 is that the flange 76 includes one flattened side 77. The flattened side 77 of the flange 76 is a feature for the insert molding related process and is used to hold the insert in the die when the thread forming portion of the die is being removed.

Figure 6A:
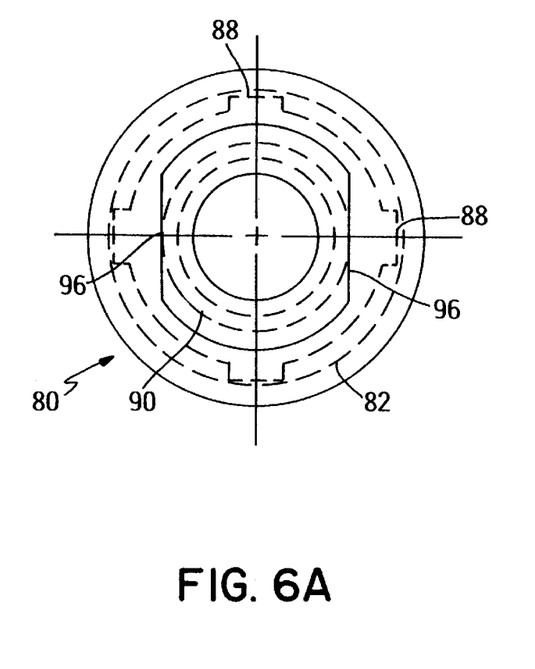
FIG. 6a is a front view of one of the inserts.
Figure 6B:
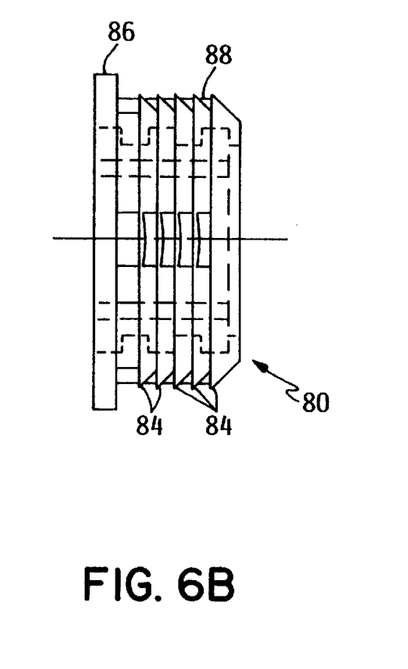
FIG. 6b is a side view of one of the inserts.
Figure 7A:
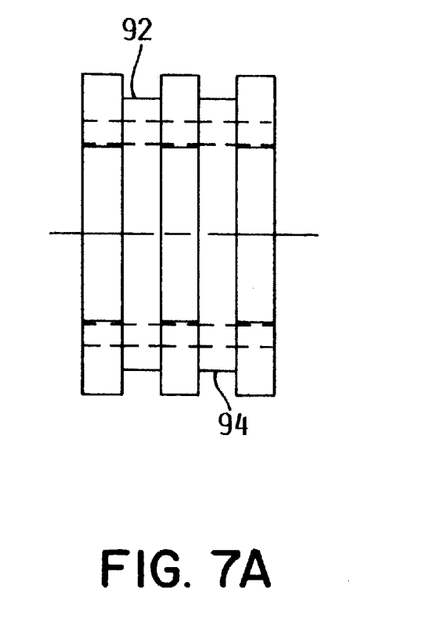
FIG. 7a is a side view of a metal core for the insert shown in FIGS. 6a–6b.
Figure 7B:
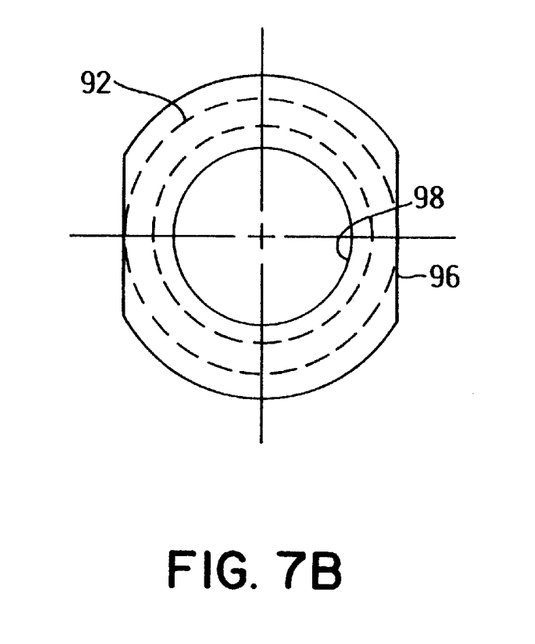
FIG. 7b is a front view of a metal core for the insert shown in FIGS. 6a–6b.

Now turning to FIGS. 6a and 6b and FIGS. 7a and 7b, still another version of insert 80 will now be discussed. Insert 80 includes a metal core 90 which is detailed in FIGS. 7a and 7b. The metal core includes a cylindrical portion 92 which has a threaded opening 98 therein which is coaxial will the cylindrical portion 92. The metal core 90 includes a pair of flattened edges 96 which oppose one another or which are on opposite sides of the cylindrical portion 92. The metal core also features a series of grooves 94 which serve to prevent pullout of the metal core after the plastic of the insert 80 is molded about the metal core 90. Now looking back at FIGS. 6a and 6b, the metal core is shown in the middle of FIG. 6a. The plastic portion around the metal core 90 in the insert 80 includes a cylindrical portion 82. On the cylindrical portion 82 are a series of barbs 84 and a flange 86 located at the end which receives the screw 48. Also along the cylindrical portion are four ribs which run along the length of the cylindrical portion 82. The ribs 88 run transverse to the barbs 84 along the cylindrical portion 82 of the insert 80.

Figure 8:
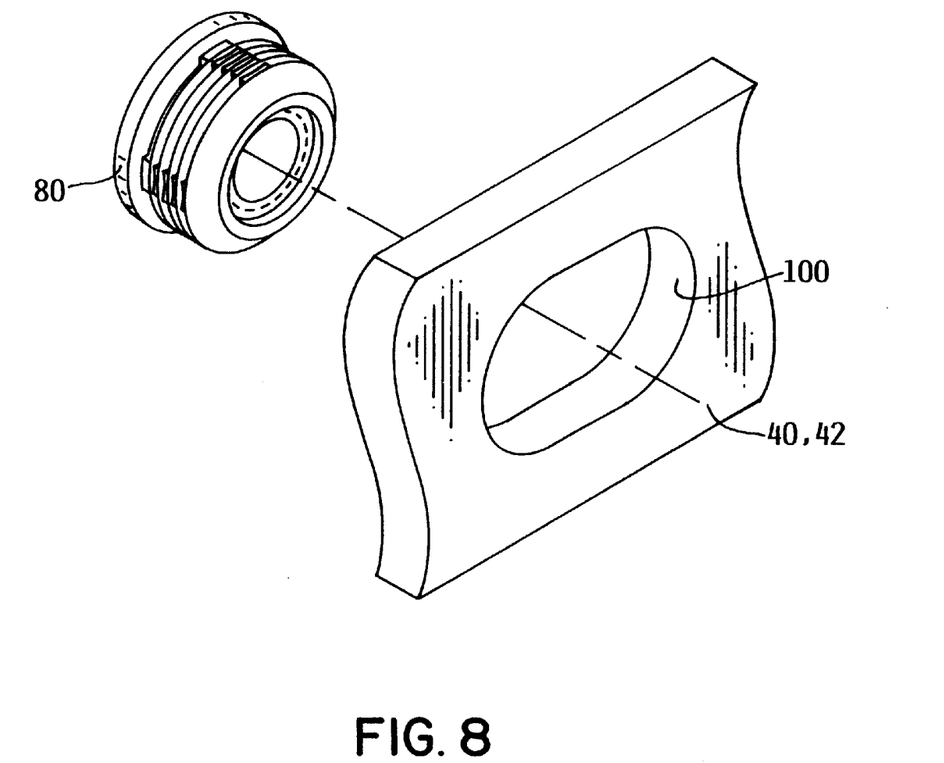
FIG. 8 shows an exploded, perspective, broken away view of an insert and an oblong opening.

All of the inserts described above, 50, 60, 70, and 80 can go into perfectly round openings in the rail 40 or 42 of a disk drive to mount the disk drive to the user frame 44. However, as shown in FIG. 8, a slightly oblong hole or opening in the rail 40 or 42 is preferable when using the insert 60, 70, or 80. The oblong nature of the hole helps to secure the disk drive to the frame in the following ways. First of all, the interference fit puts the plastic under continuous stress which over time causes the plastic to flow. A circular hole results in a lower torque capacity over time because the interference over time will become lesser due to creep in the material. In the case of an oblong hole, the plastic flows in the two less stressed quadrants, which are the oblong portions, and thus retains torque capacity. In addition, there are usually about half of the ribs that are not stripped away during the insertion process and these ribs augment the torque capacity. The ribs are actually placed at 45 degree angles away from the axis of the cylindrical portion 82 of the insert 80 and depending on the angle of insertion, some of the ribs may be removed. When turned and torqued the ribs will contact the edges of the oblong opening. Finally, the oblong hole allows the use of a larger area which lowers the force required to push the inserts into the openings 100 without compromising the pullout force of the inserts.

Figure 9:
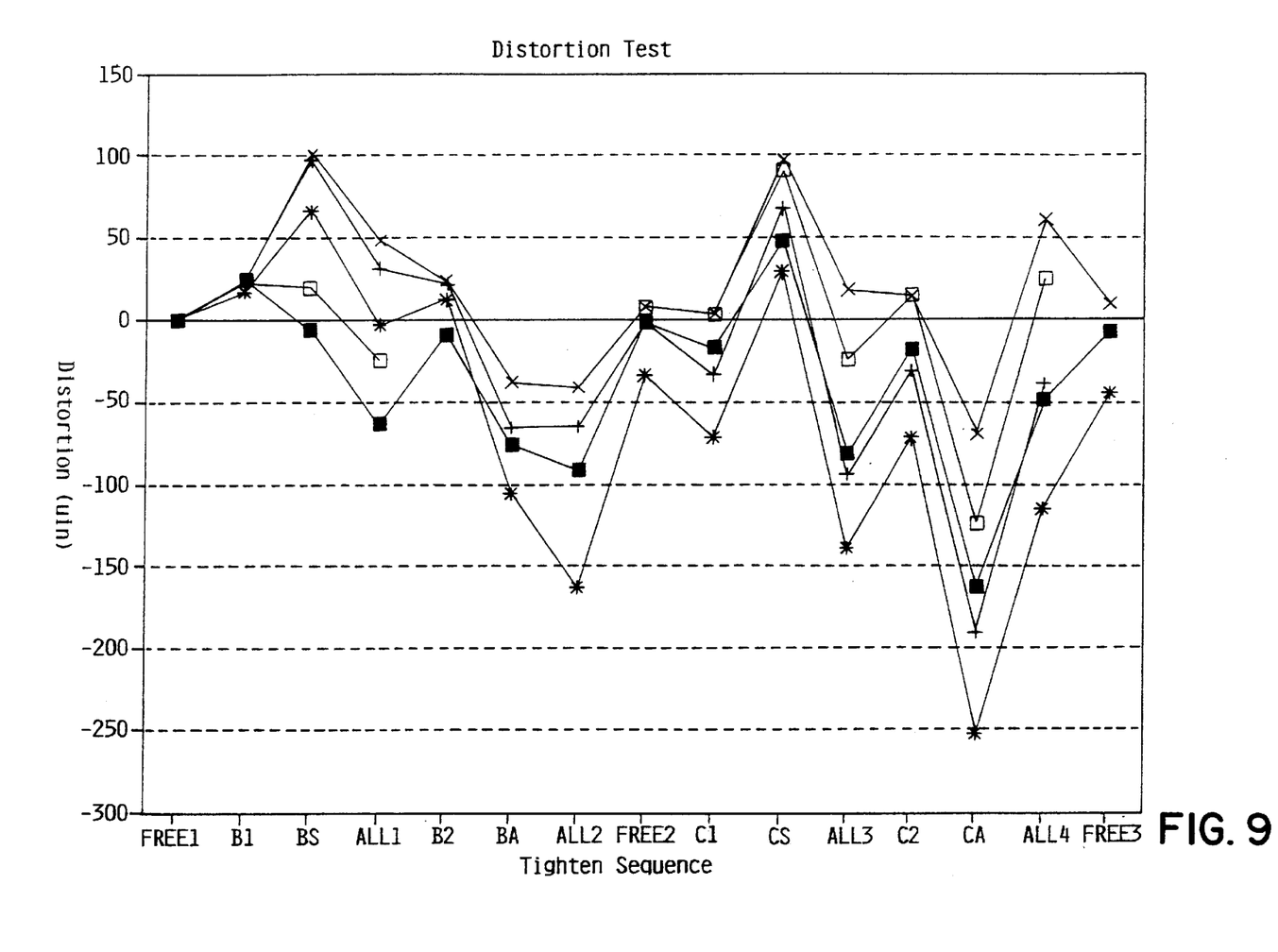
FIG. 9 shows amount of relative static movement induced due to mounting the disk drive in different types of customer frames.
Figure 10:
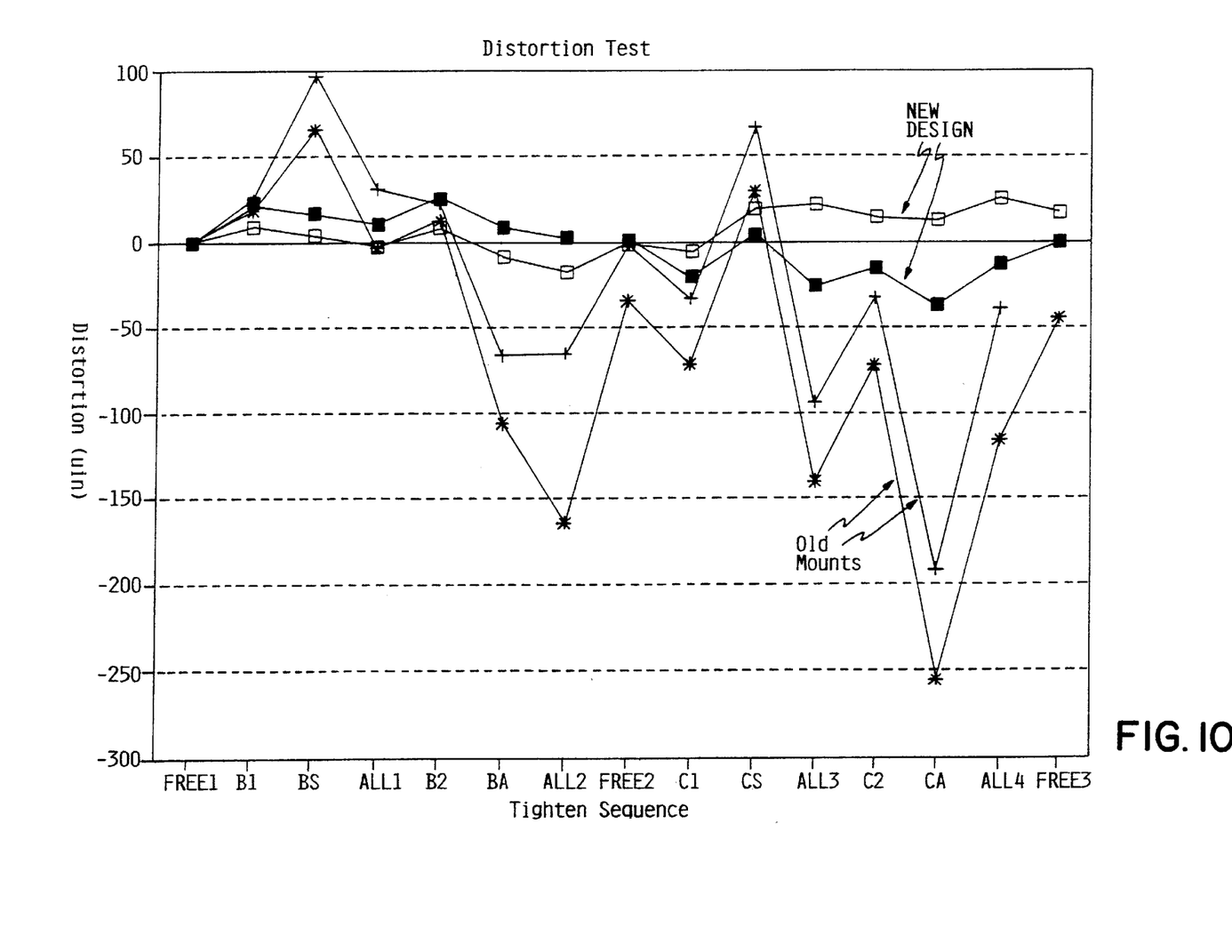
FIG. 10 shows the improvement in the amount of relative static movement by going to the new type of inserts. The amount of movement is lower in comparison to the values in FIG. 9.

Now turning to FIGS. 9 and 10, it can be seen from this data on distortion tests that these new designs mounts or inserts results in much less distortion than the old type of mount described in the Background of the Invention. FIG. 9 really shows the problem of distortion that results with the prior art method of directly mounting screws to the frame of the disk drive. Each symbol in the graph refers to a different frame. The Y axis is the amount of relative movement between the bottom head and the top head. The X axis is the sequence of tightening and loosening of the screws in a variety of ways to simulate customer mounting conditions. Along the Y axis, the distortion is shown in terms of relative motion between the top head or transducer 27 on top or one end of the disk stack and bottom head or transducer on the bottom or other end of the disk stack. Along the X axis, the first part or casting of a disk drive with the disk stack therein is at a first position which is indicated by FREE1 at the left. At FREE1 the top and bottom transducers are first measured and this is considered an undistorted state. Thus, the distortion is designated as zero. Then various screws which pass into the rails of a disk drive are tightened and ALL screws are tightened. As can be seen, when screw B1 is tightened on various disk drive frames, there is a shift between the top and bottom heads that results. As additional screws are tightened the distortion, as represented by the displacement between the top and bottom heads from an initial position, takes place. Even when all the screws are loosened at FREE2 and FREE3, residual displacement results. Large displacements occur at screw CA when that screw is tightened for example to a set torque.

FIG. 10 shows another sample in which four disk drives of the same type undergo the same tightening and loosening sequence. The two drives with the old type mounts, which have data points depicted as stars for one drive and pluses for another, have distortions with dramatic jumps very similar to those shown in FIG. 9. The two drives with data points depicted by boxes represent the drives mounted with the inserts and as can be seen, the displacements are not merely as dramatic. Thus, the data shows that given similar mounting sequences, the connectors used are much more forgiving and do not result in dramatic distortions in the disk drive. The higher the values away from zero on the Y axis, such as in FIG. 9 and in the "old mount" data of FIG. 10, the more the induced distortion and possibilities of lower performance or damage to the disk drive. Low values, which deviate only slightly from zero, such as the new design insert mounts (represented by data points as boxes) shown in FIG. 10, indicate a more robust disk drive and mean that even with torquing and loosening of the mounting screws, the relative movement between the bottom and top heads is not large. The tightening sequence was selected in an attempt to be representative of all tightening sequences such as at a those found at various computer manufacturing sites.

Figure 11:
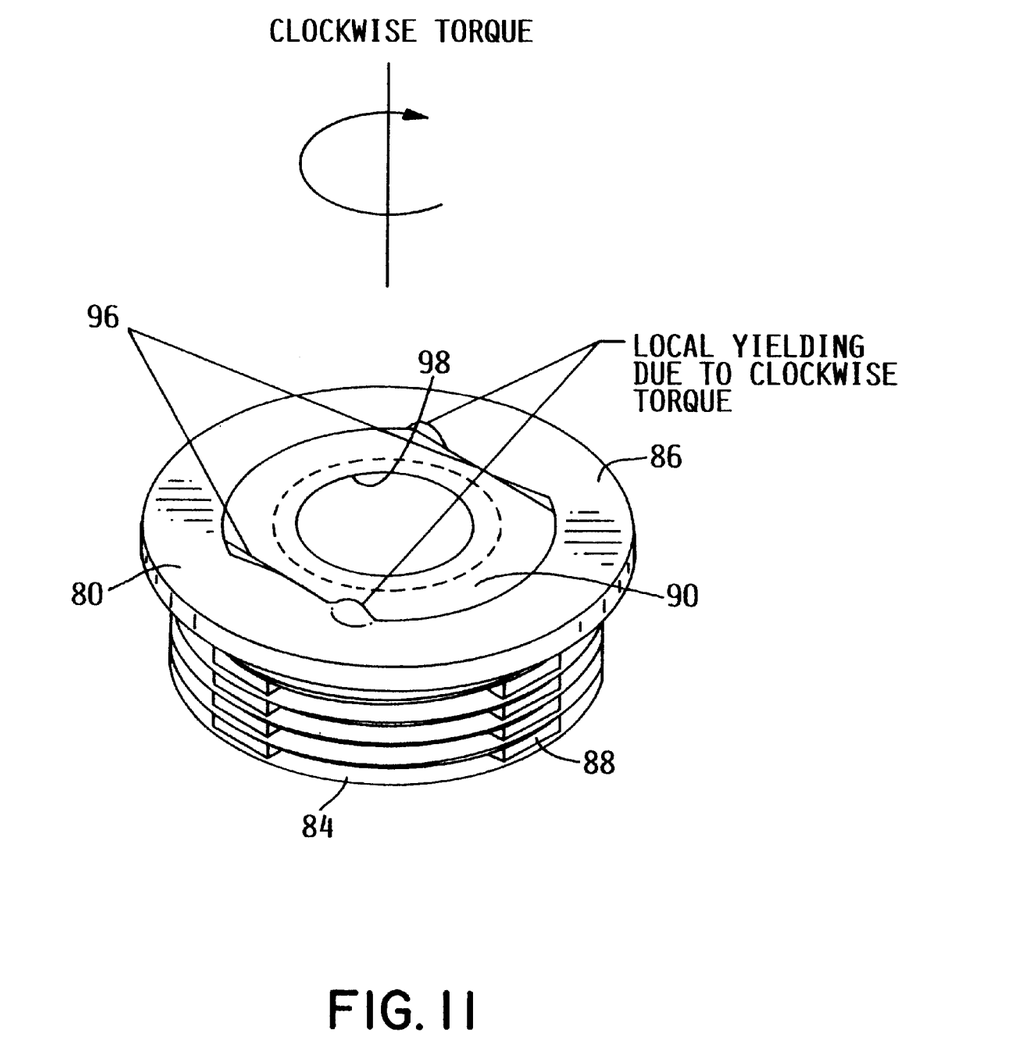
FIG. 11 is a perspective view of an insert with a metal core which shows local yielding in the plastic surrounding the core caused by excessive torque.

In operation, in all cases, the insert is placed into the opening in the rail 40 or 42 of the disk drive until the flange abuts the surface of the rail 40 or 42. The screws then pass through the user frame 44 in the user's computer and into the insert and tighten. Advantageously, as shown in FIG. 11, the plastic portion of insert 80 near the flattened edges 96 of the metal core 90 yields slightly when the torque applied to insert reaches a certain level. This shows the person applying the force to the screw 48 that a high torque level has been achieved. The insert can also be designed so that this yielding occurs when the insert has been overtorqued.

The present invention and the best modes of practicing it have been described. It is to be understood that the foregoing descriptions are illustrative only and that other means and techniques can be employed without departing from the full scope of the invention as described in the appended claims.

What we claim is:

1. An apparatus for storing data comprising:
    a housing for the apparatus for storing data, said housing having openings therein; and
    an insert within one of the openings of the housing, said insert including an electrical insulating material, and wherein the insert contains an opening that can receive a fastener, wherein the fastener fastens the housing to a frame by turning, and wherein the insert reduces distortion of the housing caused by torque of the fastener, wherein the torque results from the fastener turning.

2. The apparatus for storing data of claim 1 wherein the openings in the housing are oblong.

3. The apparatus for storing data of claim 1 wherein the insert includes a substantially cylindrical portion.

4. The apparatus for storing data of claim 3 wherein the the insert further comprises at least one barb joined to said substantially cylindrical portion, said at least one barb gripping said one of the openings in the housing.

5. The apparatus for storing data of claim 4 wherein the insert includes at least one slot therein along the length of the substantially cylindrical portion.

6. The apparatus for storing data of claim 4 wherein the insert includes a plurality of slots therein along the length of the substantially cylindrical portion.

7. The apparatus for storing data of claim 3 wherein the insert further comprises at least one rib joined to said substantially cylindrical portion, said rib running along the length of said cylindrical portion and gripping the opening in the housing.

8. The apparatus for storing data of claim 1 wherein the the insert includes a substantially cylindrical portion, said insert further including a threaded core made from a material having a higher strength than the electrical insulating material.

9. The apparatus for storing data of claim 1 wherein the insert includes a substantially cylindrical portion, said insert further including a metallic core positioned within the electrical insulating material to prevent the metal core from contacting the housing of the apparatus for storing data.

10. The apparatus of claim 9 wherein the metallic core is substantially cylindrical and includes a threaded opening therein.

11. The apparatus of claim 9 wherein the metallic core includes a pair of opposed flat surfaces.

12. An apparatus for storing data comprising:
   a housing for the apparatus for storing data, said housing having openings therein; and
   an insert within one of the openings of the housing, said insert including a deformable material, and wherein the insert contains an opening that can receive a fastener, wherein the fastener fastens the housing to a frame by turning, and wherein the insert reduces distortion of the housing caused by torque of the fastener, wherein the torque results from the fastener turning.

13. The apparatus for storing data of claim 12 wherein the openings in the housing are oblong.

14. The apparatus for storing data of claim 12 wherein the insert includes a substantially cylindrical portion.

15. The apparatus for storing data of claim 14 wherein the insert further comprises at least one barb joined to said substantially cylindrical portion, said at least one barb gripping said one of the openings in the housing.

16. The apparatus for storing data of claim 15 wherein the insert includes at least one slot therein along the length of the substantially cylindrical portion.

17. The apparatus for storing data of claim 16 wherein the insert is plastic.

18. The apparatus for storing data of claim 15 wherein the insert includes a plurality of slots therein along the length of the substantially cylindrical portion.

19. The apparatus for storing data of claim 18 wherein the insert is plastic.

20. The apparatus for storing data of claim 14 wherein the insert further comprises at least one rib joined to said substantially cylindrical portion, said rib running along the length of said cylindrical portion and gripping the opening in the housing.

21. The apparatus for storing data of claim 20 wherein the insert is plastic.

22. The apparatus for storing data of claim 14, said insert further including a threaded core made from a material having a higher strength than the deformable material.

23. The apparatus for storing data of claim 14, said insert further including a metallic core positioned within the deformable material to prevent the metal core from contacting the housing of the apparatus for storing data.

24. The apparatus of claim 23 wherein the metallic core is substantially cylindrical and includes a threaded opening therein.

25. The apparatus for storing data of claim 24 wherein the deformable material is plastic.

26. The apparatus of claim 23 wherein the metallic core includes a pair of opposed flat surfaces.

27. The apparatus for storing data of claim 26 wherein the deformable material is plastic.

28. A mounting apparatus for mounting a memory device to a frame within a computer system comprising:
   a frame associated with said computer system, said frame having openings therein for mounting the memory device to the computer system;
   a housing for the memory device, said housing having openings in a portion of said housing, said openings in the housing corresponding to the openings in said frame;
   electrically insulating inserts within said openings in said housing; and
   fasteners passing through the openings in the frame and into the electrically insulating inserts, wherein the inserts reduce distortion of the housing caused by torque of the fasteners, wherein the torque results from the fasteners turning.

29. The mounting apparatus of claim 28 wherein the electrically insulating inserts are also deformable.

30. The mounting apparatus of claim 29 wherein the electrically insulating, deformable inserts are plastic.

* * * * *

UNITED STATES PATENT AND TRADEMARK OFFICE
CERTIFICATE OF CORRECTION

PATENT NO. : 6,215,074 B1      Page 1 of 1
DATED : April 10, 2001
INVENTOR(S) : Michael S. Good; Douglas Wayne Johnson; Subrahmanyan Nagarajan; Brian Lee Rappel; Laurence J. Schmidt; Dennis Ronald Ziegenhagen It is certified that error appears in the above-identified patent and that said Letters Patent is hereby corrected as shown below:

<u>Column 9,</u>
Line 2, delete "said".
Line 46, delete "said".

Signed and Sealed this

Twenty-third Day of October, 2001

Attest:

*Nicholas P. Godici*

NICHOLAS P. GODICI
*Acting Director of the United States Patent and Trademark Office*

*Attesting Officer*